United States Patent
Mani

[19]

[11] Patent Number: 6,123,823
[45] Date of Patent: Sep. 26, 2000

[54] GASKET AND APPARATUS FOR ELECTRODEIONIZATION

[75] Inventor: K. N. Mani, Basking Ridge, N.J.

[73] Assignee: Archer Daniels Midland Company, Decatur, Ill.

[21] Appl. No.: 08/785,648

[22] Filed: Jan. 17, 1997

[51] Int. Cl.$^7$ ............................................. B01D 61/48
[52] U.S. Cl. ................................................... 204/632
[58] Field of Search ........................................ 204/632

[56] References Cited

U.S. PATENT DOCUMENTS 5,120,416  6/1992  Parsi et al. ............................. 204/632
5,154,809  10/1992  Oren et al. ............................. 204/632

*Primary Examiner*—Arun S. Phasge
*Attorney, Agent, or Firm*—Laff, Whitesel & Saret, Ltd.

[57] ABSTRACT

A gasket for an electrodeionization cell assembly has a serpentine series flow path comprising a plurality of flow path sections joined by restrictor sections to form a series flow path. The series flow paths are packed with ion exchange material. Manifold holes are located at opposite ends of the series flow path. A rigid port is positioned between each of the manifold holes and the ends of the series flow path. A plurality of the gaskets are stacked in a face to face relationship so that the manifold holes form conduits for fluid to flow to and from each of the series flow paths.

30 Claims, 10 Drawing Sheets

GASKET FOR CONCENTRATE COMPARTMENT

GASKET FOR Feed COMPARTMENT

EDI CELL GASKETS
(ROTAING THE DILUTE COMPARTMENT GASKET BY 180°
MAKES IT A CONCENTRATION COMPARTMENT GASKET)

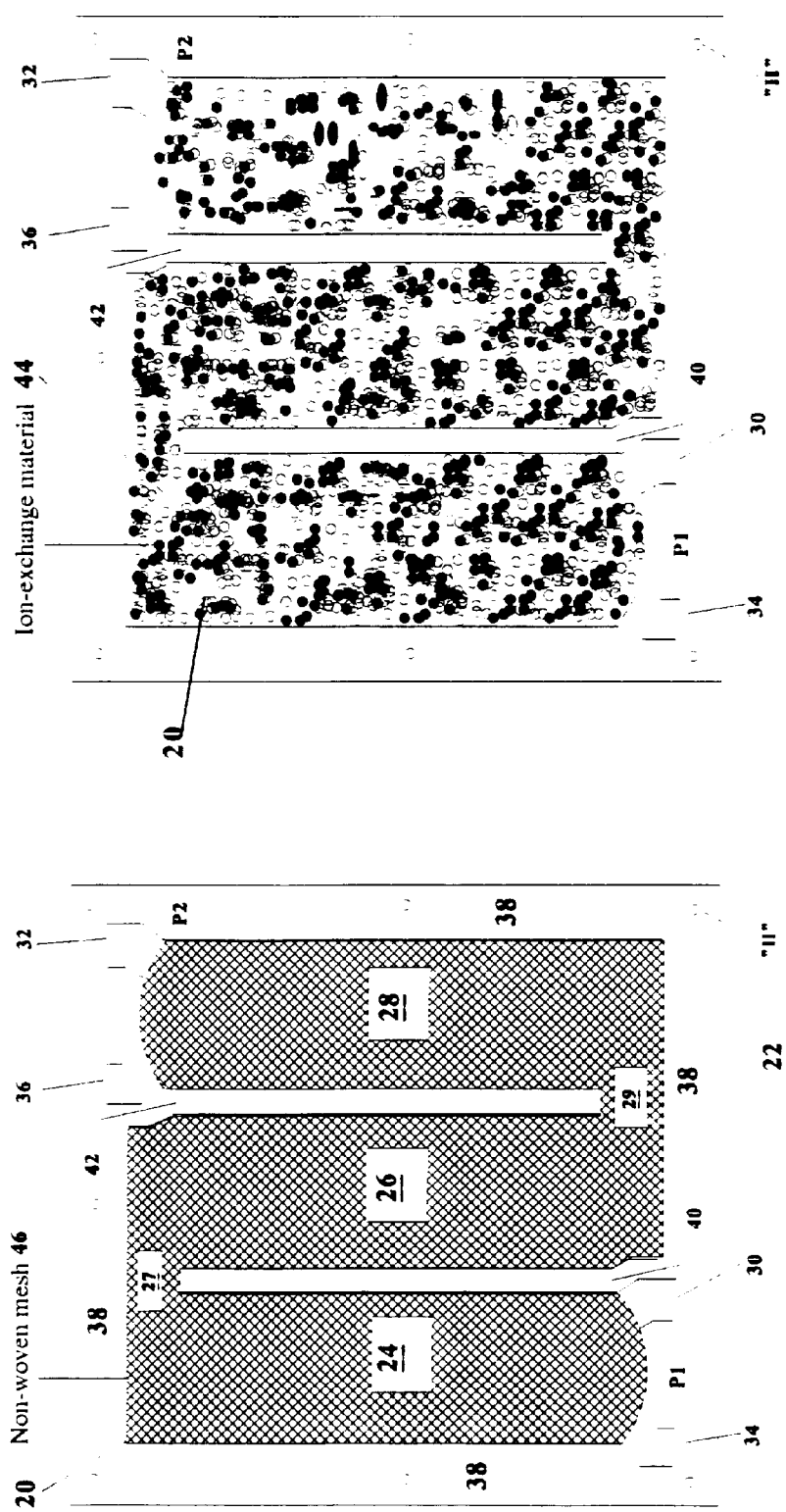
Fig. 1: EDI CELL GASKETS
(ROTAING THE DILUTE COMPARTMENT GASKET BY 180° MAKES IT A CONCENTRATION COMPARTMENT GASKET)

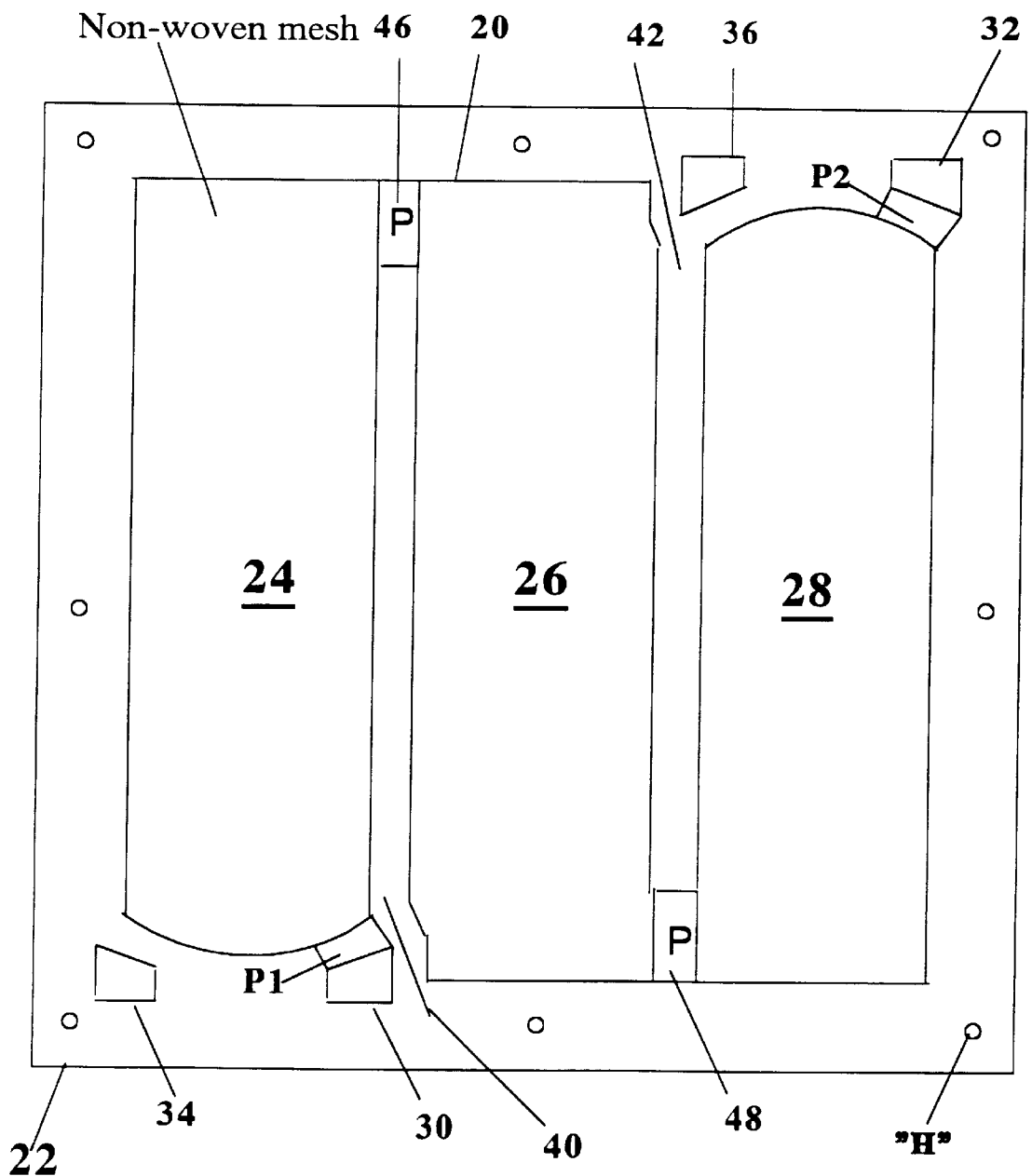
Fig: 1(c) GASKET FOR EDI CELL
WITH ADDL. PORTS BETWEEN FLOW PATHS

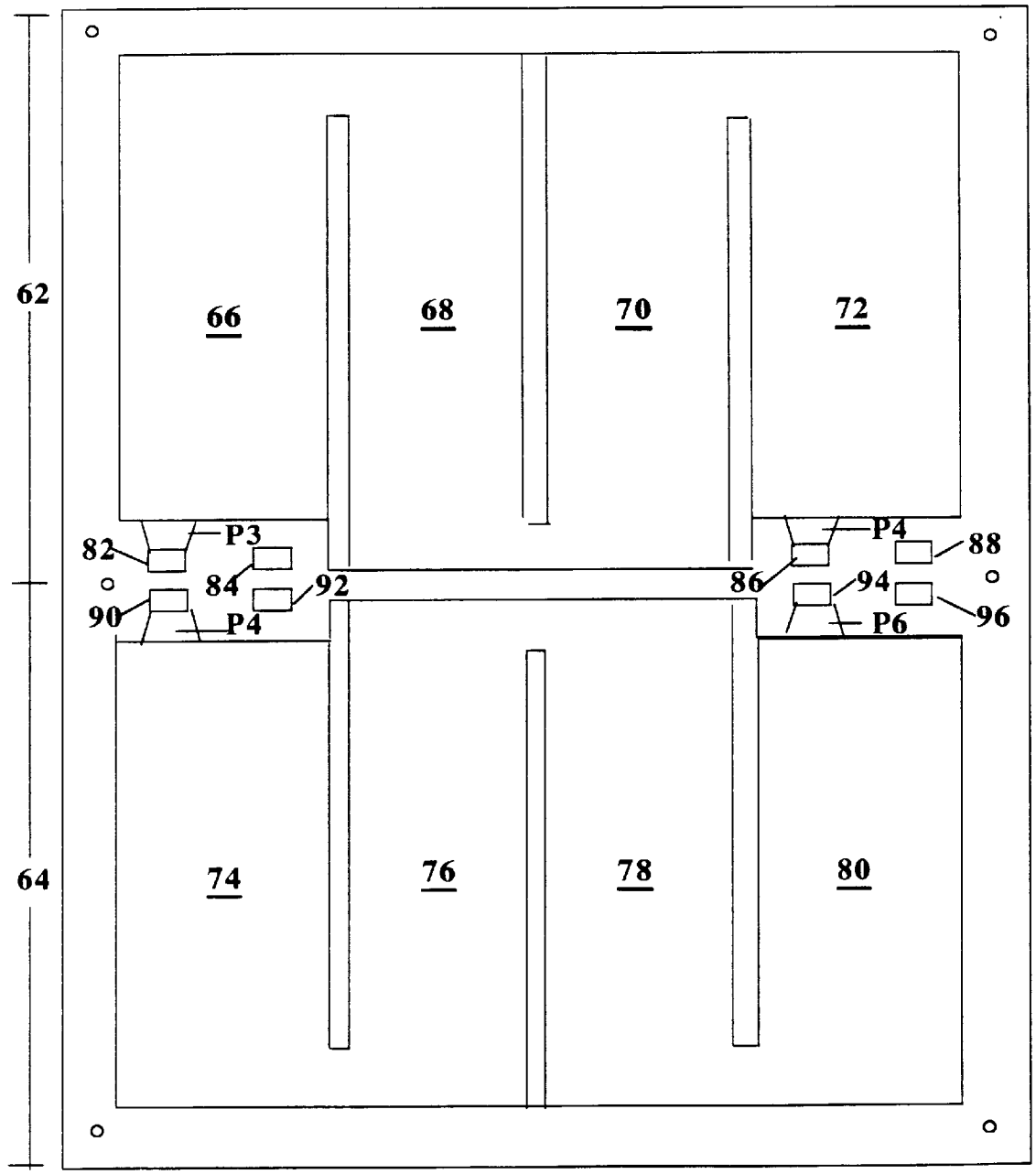
Fig. 2: Gasket with Two Series Flow Paths
8 Manifold holes, 4 ports, 2 serie paths
(6 corner alignment holes shown are typical)

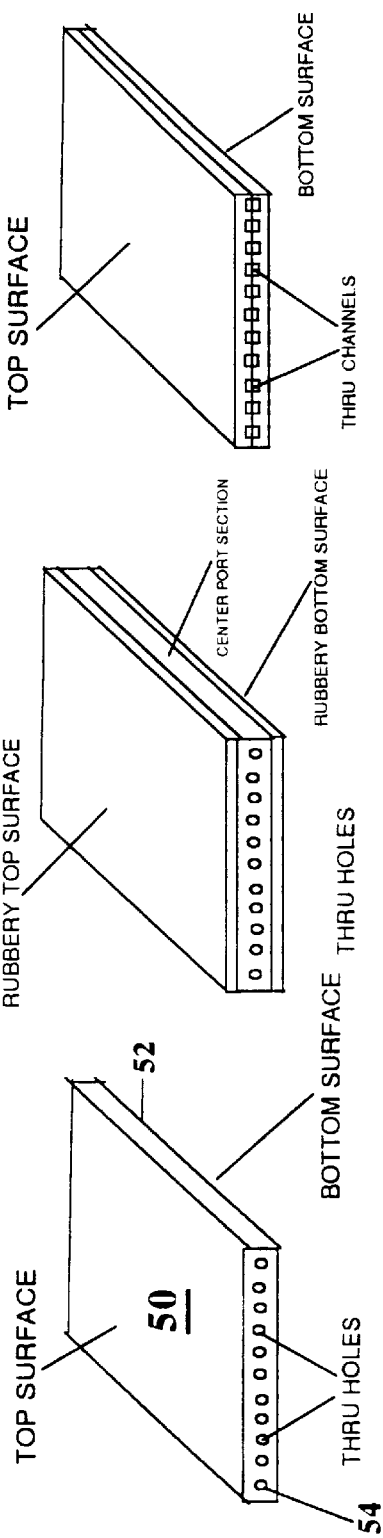
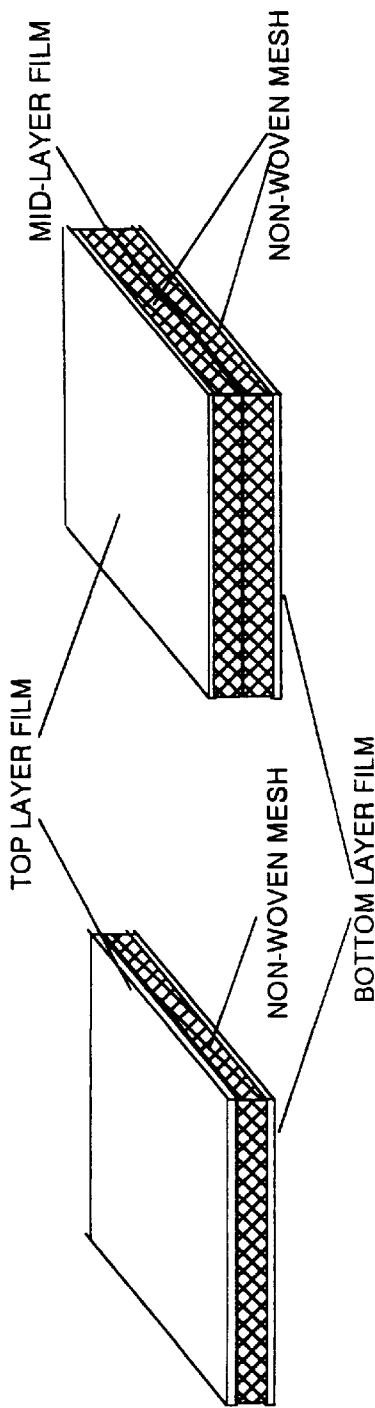
Fig. 3: PORT CONSTRUCTION DETAILS

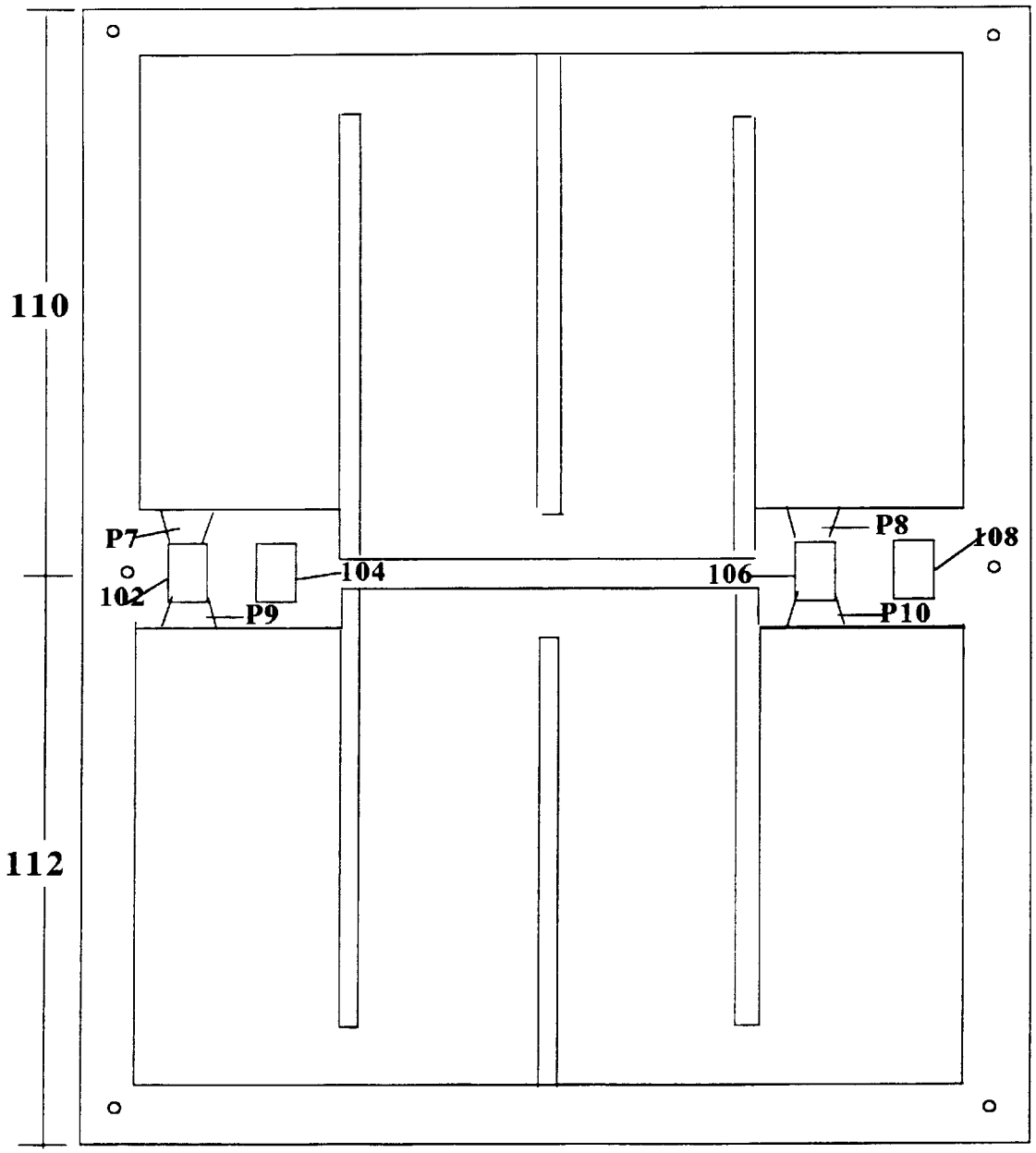
Fig: 4 Gasket with Two Series Flow Paths
4 Manifold holes, 4 ports, 2 serie paths
(6 corner alignment holes shown are typical)

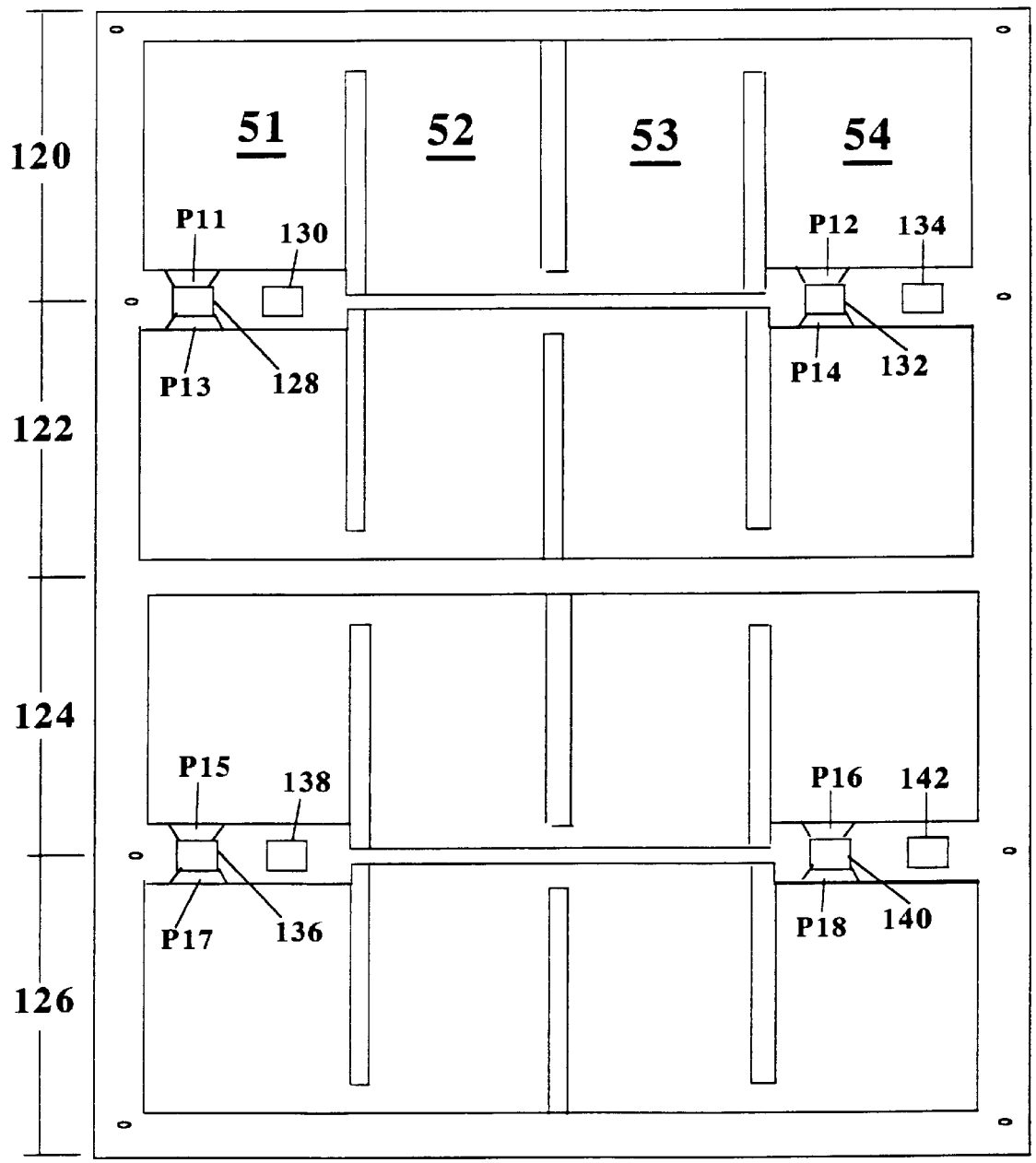
Fig. 5: Gasket with Four Series Flow Paths
8 Manifold holes, 8 ports, 4 serie paths
(8 corner alignment holes shown are typical)

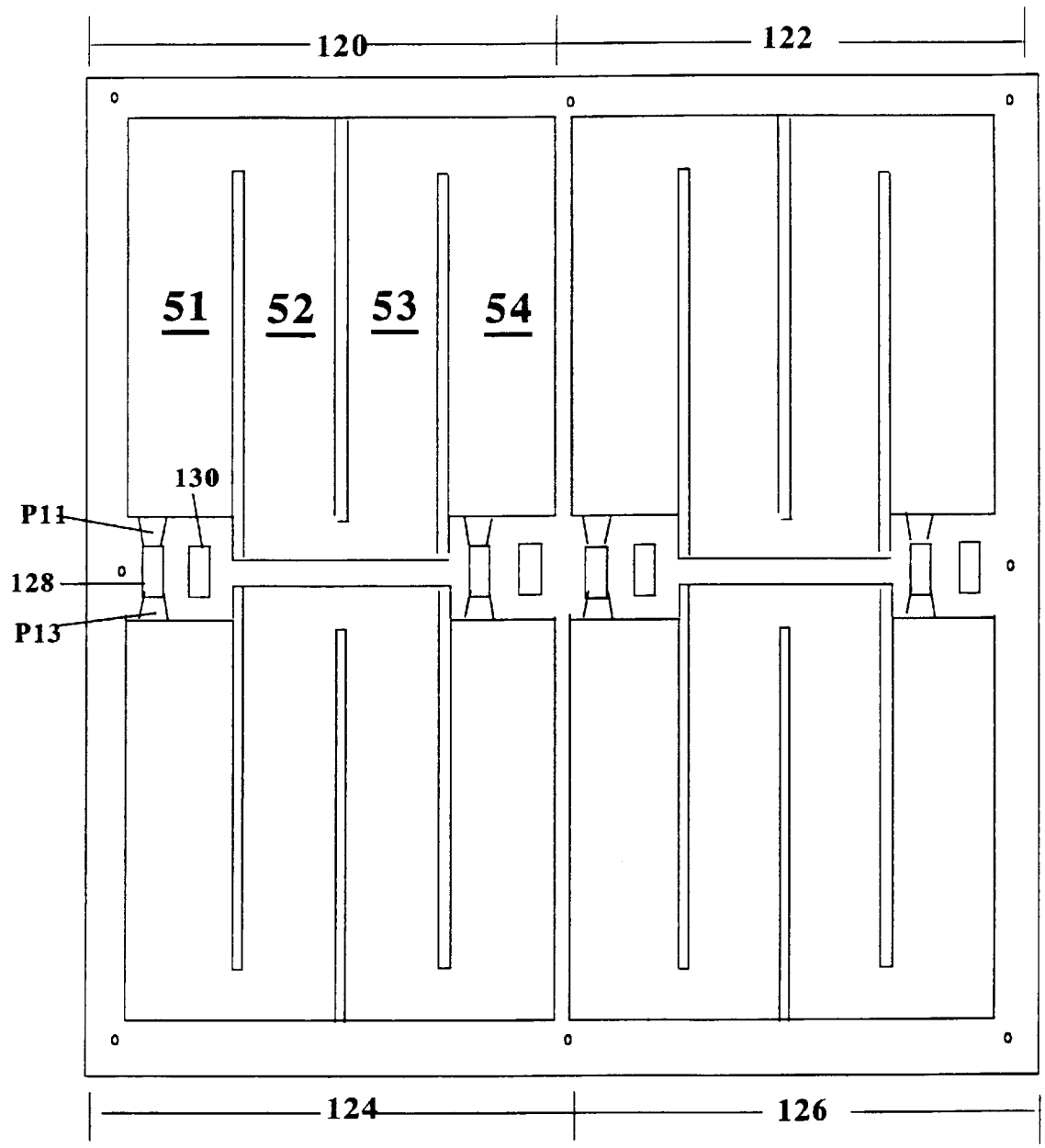
Fig. 5(a): Gasket with Four Series Flow Paths
8 Manifold holes, 8 ports, 4 serie paths
(8 corner alignment holes shown are typical)

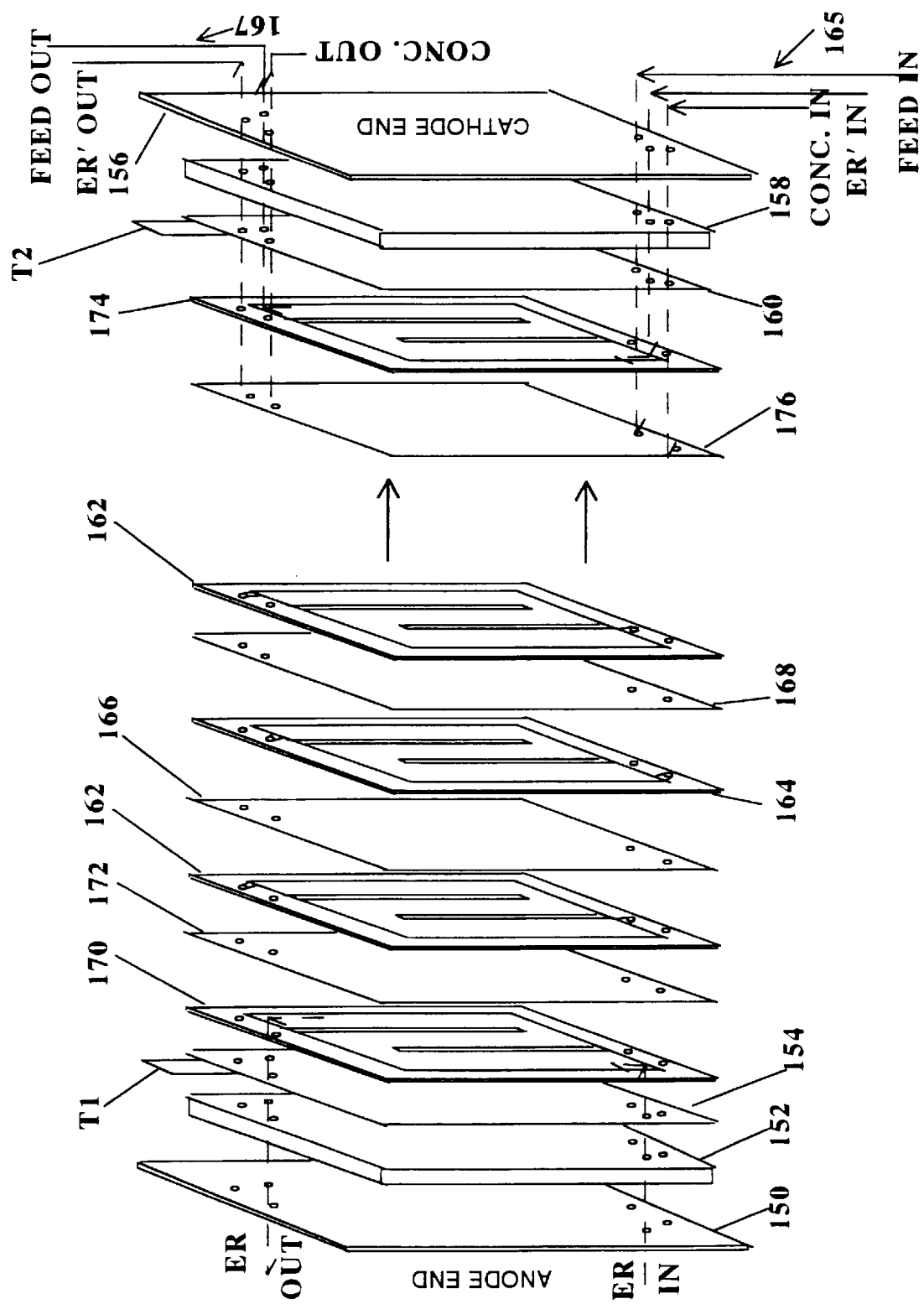
Fig. 6: EDI CELL ASSEMBLY

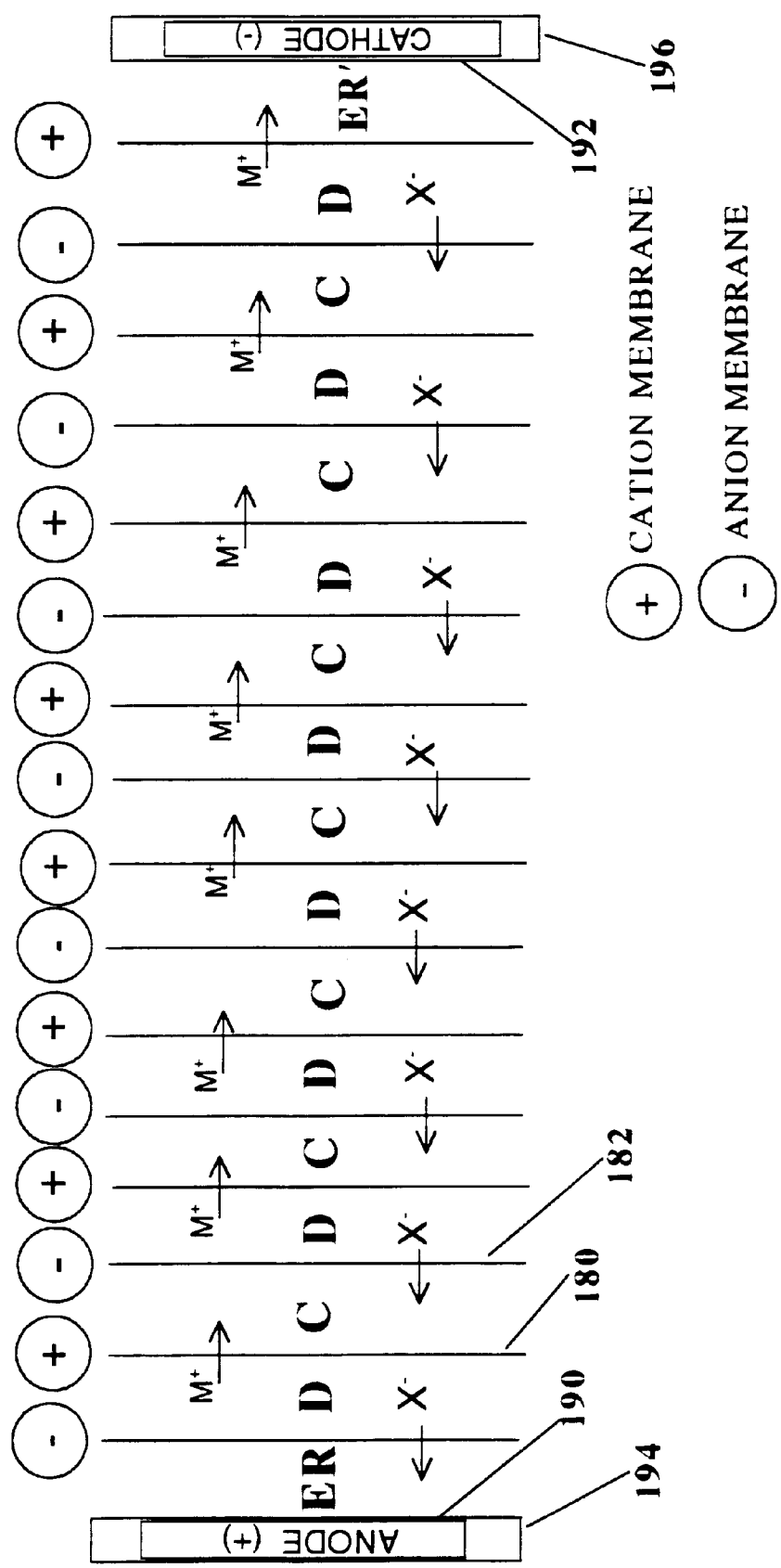
Fig. 7: EDI TEST CELL ASSEMBLY

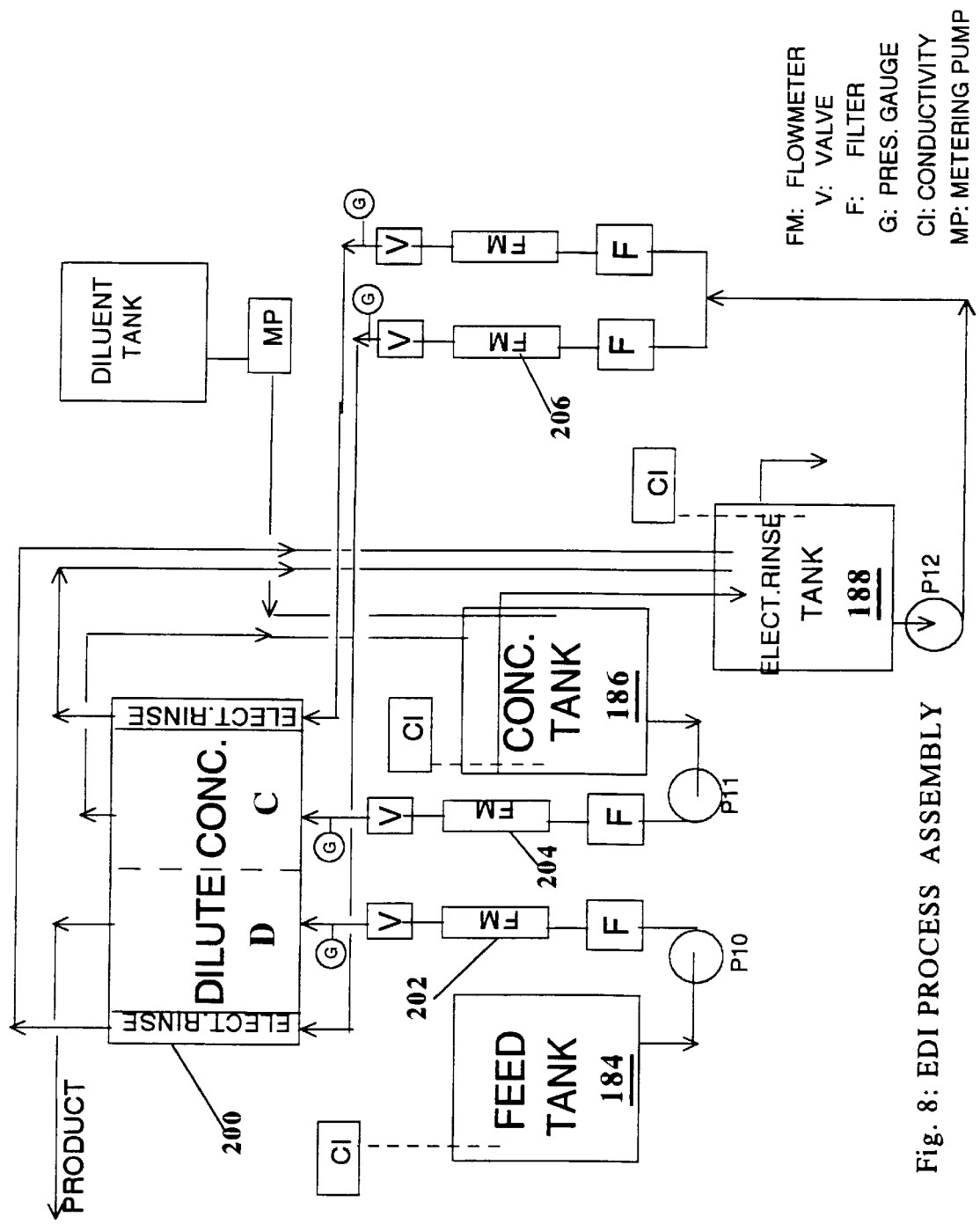
Fig. 8: EDI PROCESS ASSEMBLY

GASKET AND APPARATUS FOR ELECTRODEIONIZATION

This invention relates to electrodeionization apparatuses and more particularly to inexpensive gaskets used in order to transfer ions in a liquid, under a direct current driving force, and to obtain a high desalination of liquids.

BACKGROUND OF THE INVENTION

Electrodeionization is a recognized means for achieving high levels of desalination of aqueous liquids. The process involves an ion exchange material, such as an ion exchange resin, which is in a feed or ion depleting compartment formed in a gasket positioned between anion and cation exchange membranes.

The invention may find many uses such as processing dextrose, sucrose, and fructose, for example. An aqueous feed stream that needs to be desalted is circulated in the depleting compartment.

The electrodeionization process is detailed in a number of U.S. patents. The more important and recently issued U.S. Pat. Nos. are: 4,066,375; 4,203,976; 4,249,422; 4,465,573; 4,632,745; 4,727,929; 4,871,431; 4,925,541; 4,931,160; 4,956,071; 4,969,983; 5,066,375; 5,116,509; 5,120,416; 5,203,976; 5,292,422; 5,308,466 and 5,316,637. The gaskets or chambers used in the ion depleting compartments (i.e., the compartments containing ion exchange material), disclosed in these patents are of various designs.

U.S. Pat. No. 4,465,573 describes a gasket containing narrow "tortuous" flow paths that are filled with ion-exchange resins. These paths are formed by a plurality of parallel "ribs" extending from the stream inlet to the outlet. The water stream that needs to be deionized (purified) is passed through these paths. The gasket design of the patent is complex, requiring a careful meshing of the gasket components for the feed and concentrate streams, and will likely have a high pressure drop.

U.S. Pat. Nos. 4,632,745; 4,747,929; 4,925,541; 4,931,160 and 4,956,071 (assigned to the Millipore Corporation) describe a gasket, apparatus and process wherein the spacer construction for the feed (also termed the depletion or the ion depletion) compartment comprises a feed inlet and outlet with a distribution manifold in communication with an inlet and a central section. The distribution manifold feeds the central section. The central section has a thickness which is the same as the thickness of the gasket and is defined by a plurality of ribs extending along the length of the central section to form subcompartments having a width defined by the distance between the two adjacent ribs or by the distance between a rib and an adjacent longitudinal edge section of the gasket. Also, there are fingers extending from the manifold to the inlet of the subcompartments in the central section. An ion exchange material fills the subcompartments, the feed and, optionally, the concentration compartments.

The subcompartments are relatively narrow, preferably between 0.5 and 1.5 inches. To ensure good sealing, the ion exchange membranes are glued or bonded to the feed compartment gasket. The design is fairly complex and requires a significantly large amount of membrane area sealed to the gasket. Therefore, this sealed area is not available for ion removal. The use of multiple parallel subcompartments improves the rigidity of the gasket and the containment of the ion exchange resin material; however, it requires large fluid distribution areas and can result in fluid distribution problems.

U.S. Pat. Nos. 4,066,375; 4,203,976; 5,120,416; (assigned to Ionics, Inc.) deal with a gasket design and with electro-deionization apparatus that enables an introduction and removal of ion exchange resins and other particulates from assembled deionization stacks. The design either requires a third set of relatively open inlet manifolds to permit an introduction and removal of said resins and particles or requires one of the other two (i.e., inlet or outlet) channels to permit the entry and exit of the particles. To provide a good sealing between the feed and the concentration compartments, particularly at the third inlet manifolds, these membranes have to be sufficiently immobilized and must not be prone to swelling/wrinkling. The introduction of the third set of ports introduces additional sealing problems as well as a reduction in the useful membrane area available for the actual desalting operation.

While the ability to fill and empty the particulates from the electrodeionization stack after the assembly of the gaskets and membranes is an advantage, one still has to disassemble the stacks if there are problems related to membrane fouling, leakage or breakage. Additionally, a proper packing of the desalting compartment is not assured, particularly for large stacks and when dealing with multiple flow paths. The design also becomes superfluous, if ion exchange materials in the form of a felt or fabric are deployed instead of resin beads.

U.S. Pat. No. 4,249,422 (assigned to IP Holdings) discloses an electrodeionization apparatus having an improved sealing between the membranes and the gaskets. The apparatus employs a plurality of disk shaped diluting and concentrating cell pairs. This apparatus facilitates filling the individual cells with ion exchange resins. While offering some improvements over the earlier designs, it is still rather complex.

Therefore, a need exists for an improved electrodeionization gasket and associated apparatus that enables a greater utilization of the ion exchange membranes and that can use high performance membranes, i.e., thin, higher selectivity, low electrical resistance or unreinforced type membranes, that may be prone to swelling/wrinkling. These membranes must be adequately supported in the central area and sealed against the feed and concentration compartment gaskets.

A need also exists for a gasket that assures good fluid flow and electrical current distribution and that has a low overall pressure drop for fluid flow. Also, the gasket should contain the ion exchange material without excessive migration of resin beads during extended periods of operation.

A further need exists for a gasket that is simple in construction, that can be built in a large size (exceeding 1 m$^2$ in overall area), that can efficiently use the ion exchange material in either the resin bead or felt/cloth form, and that is easy to assemble/disassemble into an electrodeionization apparatus. The apparatus should be capable of modular assembly.

SUMMARY OF THE INVENTION

In keeping with an aspect of the invention, the gasket is inexpensive to construct which: (a) can retain ion exchange resin beads within an ion depleting compartment formed within the gasket, (b) can assure an even liquid flow within the gasket compartment at low pressure drops, (c) can avoid resin segregation and migration as well as liquid inlets and outlets pluggage by the beads, and (d) can obtain substantially high desalination of aqueous liquids or process streams.

The invention provides a gasket or separator, apparatus, and method for electrodeionization of water or desalting process streams. The central area of the gasket is separated into a plurality of flow path sections which are of substantially equal width that is preferably two to eight inches. The individual flow path sections are separated from each other by "ribs" of gasket material which has a thickness that is the same as the thickness of the gasket at the periphery thereof. A number from 2 to 6, preferably 3 to 4, of these flow path sections are connected in series by flow restrictors. The individual flow restrictors are at points where they make 180° turns, in order to form the series flow paths. The combination of such flow path sections extending from an inlet to an outlet is called a "series flow path." The restrictors increase the velocity of fluid flowing through the series flow path to about 150–200% of the velocity of fluid flowing through the rest of the series flow paths.

The flow restrictors which join the individual flow path sections may also be the filled with the ion exchange or the mesh material used in the concentrate compartment. Or, the flow restrictors may comprise a separate port. The width of the restrictor may be 20 to 90% of the flow path width.

Each series flow path has two "ports" to give a liquid stream an entrance to and an exit from the series flow path. More than one such series flow path may exist within a single gasket, and such series flow paths may be connected in parallel.

The ribs have a width adequate to ensure separation of the individual flow path sections and a sealing against the adjacent membranes and against the gaskets of the adjoining compartments, and to provide adequate support for the membranes. In practice, the gasket, ribs and manifold holes are fashioned out of a single starting sheet of gasket material having a uniform thickness.

If the gasket is to be used as a feed or dilution compartment gasket, the flow path sections are filled with an ion exchange material preferably in its least swollen form, typically a sodium form for the cation exchange resin and a chloride form for the anion exchange resin. If a mixture of the resins is employed, it may be conditioned in a sodium chloride solution before being used to fill the flow paths.

If the gasket is to be used as a product or concentration compartment gasket, the flow path sections are filled with a suitable mesh material (preferably non-woven) which has a thickness that is substantially the same as the overall thickness of the gasket, is chemically resistant to the fluid being processed, and has a significant open area (>50%) for enabling a flow of liquid and of an electrical current.

The ion exchange material used in the electrodeionization cell compartments may be a cation or anion exchange resin or a mixture of the two types of resins. Alternatively, the resins may be in the form of a felt or resin cloth. A third option is to place the resins within a cloth mesh which is tightly woven or otherwise sufficiently microporous so as to confine the resins. Regardless of the material used, the resin containing cloth mesh is inserted into the series flow path forming the active area of the gasket. The cloth has an open area of 30–75% to enable a passage of fluid and electricity. The cloth used to encase the ion exchange material may be made of a polyolefin or fluorinated polymer material. Optionally, the cloth may be further functionalized in the manner of a cation or anion exchange membrane by using a standard technique, such as a radiation treatment, styrenation and sulfonation or syrenation and chloromethylation.

The gaskets also contain manifold holes which align when a plurality of gaskets are stacked together in order to provide a path or channel for a delivery of liquids into and out of the gasket series flow paths as well as forming conduits for distributing the liquid to all the parallel cells in the electrodeionization stack. There is a maximum of two manifold holes per series flow path, per process stream. On the minimum number side, a plurality of series flow paths on a single gasket may share manifold holes.

The gaskets themselves may be made of a suitable soft material (e.g., EPDM rubber or low density polyethylene) or composite comprising a harder core (e.g., polypropylene) laminated with a softer rubbery material such as styrene-butadiene rubber on one or both sides. Regardless of the material that is used, all of the gaskets have a substantially uniform thickness.

The ports that interconnect the manifold holes and series flow paths nominally have the same overall thickness as the gasket. The ports have flat top and bottom surfaces with a rigidity adequate to prevent their collapse under the applied stack closure pressure. On either side of the gasket, these flat surfaces seal against the adjacent ion-exchange membranes. The space between the top and bottom surfaces is adequate to provide a suitable liquid flow channel. The ports, and the mesh material, if deployed, may be mechanically attached to the feed gasket for ease of handling.

Under the influence of a direct current driving force, the ions are transported from the feed stream, across the ion exchange membranes, and into concentration compartments on either side of the feed compartment. The inventive process is quite effective in removing ions from liquid. The inventive electrodeionization process differs from conventional electrodialysis process which does not employ ion an exchange material in feed or the concentration compartments.

The electrodeionization apparatus is constructed by assembling a nearly equal number (e.g. 20 to 100) of the feed and concentrate compartment gaskets in an alternating manner. That is, a cation membrane is placed on one side and an anion membrane on the other side of the feed compartment. The outer surfaces of the membranes are next to the concentrate compartments. The entire assembly becomes an electrodeionization stack module. An electrode compartment is formed on each end of the stack module with, for example, an anode on the left-hand and cathode on the right-hand ends of the stack. The anode and cathode house electrodes that are used for the process and are connected to a DC source. The stack module thus constructed is effective in desalting aqueous salt and sugar containing solutions.

BRIEF DESCRIPTION OF THE DRAWINGS

Preferred embodiments of the invention will become apparent from the following specification taken with the attached drawings, in which:

FIGS. 1(a)–1(c) show the construction of an inventive gasket used in an electrodeionization apparatus;

FIG. 2 shows a gasket of this invention which contains two series flow paths;

FIGS. 3(a)–3(e) show some of the port designs that may be used in the inventive gasket;

FIG. 4 shows a gasket that contains common manifolds shared by two series flow paths;

FIGS. 5 and 5(a) show two flow arrangements with common manifolds, arranged to provide four series flow paths;

FIG. 6 is an exploded view of an exemplary inventive electrodeionization apparatus utilizing the series flow path gaskets;

FIG. 7 is a schematic cell layout of the electrodeionization stack; and

FIG. 8 is a block diagram which shows a pilot system used in testing the electrodeionization process.

DETAILED DESCRIPTION OF THE VARIOUS EMBODIMENTS

In accordance with this invention, an electrodeionization gasket provides a substantially leak free operation, has a good long term reliability, a low pressure drop, a reduced fluid recirculation requirement, and a reduction of shunt/stray electrical current losses. In comparison with the prior art, the inventive gasket is simpler to construct and assemble and has a larger active membrane area for current transport and for the production of desalted liquids.

FIGS. 1(a)–1(c) show the construction of a gasket which can be used either as a feed or diluting compartment or as a concentration compartment. The active or central area 20 of the gasket 22 is divided into a plurality of flow path sections 24, 26, 28 which are connected in series by restrictor sections 27, 29 in order to form a serpentine path between inlet and outlet ports P1, P2, respectively. The eight "H" holes in the periphery of the gasket provide a means for aligning the various gaskets and membranes in the electrodeionization stack and for clamping the stack together. Not all of these holes need be used in the construction of the stack.

The gasket has two manifold holes 30 and 32, through which the liquid feed stream enters and exits the gasket, for example. Two other manifold holes 34 and 36 provide the "piping" conduits for a second (concentrate) stream. Since the gaskets are of uniform thickness, there is a good mating and sealing of the gaskets against adjacent ion exchange membranes. The central area 20 of the gasket contained by the gasket edges (such as 38) and the intermediate support ribs 40, 42 in the feed (or desalting) compartment is filled with the resin or other ion exchange material, shown as 44 in FIG. 1(b). Or, a plastic netting material may fill the concentrating compartment as shown as 46 in FIG. 1(a).

The ion exchange material in the central area 44 in FIG. 1(b) may be a cation or anion exchange resin or a mixture of the two resins. Alternatively, ion exchange material that has been fabricated into a mesh or mat may be used. Or, the ion exchange resin material may optionally be contained within a tightly knit or suitably microporous polymeric cloth. These latter options contribute to the ease of both original assembly and of resin removal and replacement, if the resin's performance decreases over time. This resin replacement option removes the need for discarding the entire gasket/membrane assembly. The thickness of the compartment 44 containing the ion exchange material is preferably 1.5 to 5 mm. Thinner compartments may lead to an inadequate packing of the ion exchange material. Thicker compartments do not provide a significant process improvement and may result in higher electrical power consumption.

The gasket for the concentration compartment (FIG. 1(a)) is usually made thinner than the compartment containing the ion exchange material, typically 0.5 to 3 mm and is preferably filled with a plastic netting having a large open area, because the solution flowing therein has a higher electrical conductivity. The thinner gasket affording a higher linear flow velocity at a given pumping rate, reduces polarization, and lowers electrical power consumption. The overall dimensions of the gasket may be 13"×13", in one example.

The solution enters the active area 44 (FIG. 1(b)) of the gasket via manifold hole 30 and the port P1 and leaves the active area via port P2 and manifold hole 32.

The active area comprises three flow path sections 24, 26, 28 (FIG. 1(a)) connected in series. The width of the flow path section is about 2.875" and constitutes 22% of the overall gasket width. The path section should be wide enough to accommodate the manifold holes 30, 32 that feed the gaskets as well to provide an adequate space between the holes to enable a good seal between the gasket and the membranes in the stack module. The area of the manifold holes is determined by hydraulic considerations, such as the volumetric flow of liquid, per gasket, and the number of gaskets in a given stack module.

The flow path in the gasket should be narrow enough to provide a good flow distribution between all the gaskets, standing in parallel within the electrodeionization stack, and to provide the requisite turbulence within the flow path. The narrower flow path also improves the mechanical support for the membranes which is provided by the gasket edges and the ribs. However, the narrower flow path is used at the expense of a reduced active membrane area and an increased pressure drop.

The inventive gasket may have two to six flow path section which are connected in series, with the width of the flow path being 5–49% of the total gasket width. The optimal and preferred series flow path has three to four path sections. In absolute terms, the flow path width may range from 2" to 8", preferably 2.5" to 6". Narrower paths do not necessarily provide increased reliability; in fact, it increases the gasket complexity. Excessive widths lead to a poor flow distribution and to an inadequate membrane support for many of the commercially available membranes. The series flow path in the feed compartment gasket is filled with suitable ion exchange material, which may be a cation exchange resin, anion exchange resin or a mixture of cation and anion resins. For most deionization applications which involve a removal of cations and anions, a mixed bed ion exchange material is preferred.

The ion exchange materials are washed to remove organic materials and other impurities. The ion exchange materials are converted to their least swollen form, typically the $Na^+$ and $Cl^-$ forms for the cation and anion resins respectively, by equilibrating in the appropriate media.

Suitable ion exchange resins are widely available from Rohm and Haas, Dow Chemical and other sources. The preferred resin bead diameter is 0.4–0.5 mm; with the commercial resin beads being rated at 16–50 mesh. Ion exchange material in the felt form are available from Nitivy Corporation, Japan. Porous cloths for containing the resins in the bead form are available from a large number of vendors, such as Tetko Inc.

For the concentrating compartment gaskets, a polymeric mesh, preferably of the non-woven type, material is placed in the flow path. The overall thickness of the mesh is approximately the same as the thickness of the gasket itself. The mesh material is chemically stable relative to the fluid being processed in the stack. Materials that are suitable for a mesh include polyethylene, polypropylene, polytetrafluoroethylene and polyvinyl chloride. Suitable mesh materials are available from Nalle Plastics and Applied Extrusion Technology. A preferred mesh density is 8–16 strands/inch, with the more preferred density being 10–12 strands/inch.

The desalting or electrodeionization compartment contains the ion exchange resin. Normally, the concentration compartment does not contain such ion exchange resin. Both compartments may contain fibrous material. Some the fibrous material may be a material (such as cloth, felt, etc.) used to contain or retain the ion resin materials. Other of the fibrous material may be an open mesh, which is there to promote turbulence in the liquid traveling through the flow path. For convenience of expression, the open mesh will herein, sometimes be called the a "turbulence promoter" or "turbulence promoting," regardless of which compartment it is in.

The electrodeionization process a low electrical current density, typically 1–10 mA/cm². Consequently, heat generation is not a significant problem. The use of multiple flow paths connected in series provides a good fluid distribution within the stack, even at relatively low linear flow velocities, such as 2–5 cm/sec, for example, in the concentrating compartments and even lower, e.g., 0.2–0.5 cm/sec, in the feed (or desalting) compartments.

As seen in FIG. 1, the liquid enters the serpentine series flow path via manifold hole 30 and port P1. After circulating through the series connected flow path, the liquid exits through the port P2 and manifold hole 32. The individual flow path sections are separated from each other by ribs 40, 42, formed by appropriate cutouts in the gasket raw material. The ribs are wide enough to provide adequate support for the adjacent membranes, as well as to provide adequate sealing and separation for the individual flow paths. Yet, the ribs should be as narrow as practical in order to maximize the usable membrane area. The rib width can be in the order of 0.25 cm to 4 cm, with the preferred range being 1 to 2.5 cm.

The individual flow path sections 24, 26, 28 (FIG. 1(c)) are next to one another and are connected to each other through flow restrictor sections 46, 48, to form a serpentine path through the active area. In reality, these sections may be considered secondary ports that may be filled with the ion exchange material when used in the desalting compartment, or with turbulence promoting mesh material when in the concentrating compartment. Alternatively, one may use either a denser mesh material, (e.g., 12 to 30 strands per inch) in the flow restrictor sections or a port having a design which is the same design that is used for port P1.

The width of the restrictor sections 46, 48 may be 20 to 90% of the flow path width, preferably 30 to 50% of the flow path width. The length of the flow restrictor section is approximately the same as the width of the ribs, but in principle may be somewhat shorter and impacts the distribution of fluids in the individual flow path sections and by serves to eliminate "dead corners". The flow restrictor sections, 46, 48 (FIG. 1(c)), may be rectangular as shown in the figures. They may also be trapezoidal, progressively constricting, a venturi, or a V shape for providing a better pressure recovery.

Ports P1 and P2 are preferably of identical design. Some of the possible designs for the ports are shown in FIGS. 3(a)–3(e). The top and bottom surfaces 50, 52 of the port are flat in order to readily seal against the adjacent membranes and gaskets. The port is composed of a material that is rigid enough to avoid collapsing the interior flow channels under a pressure applied as a stack closure force. The port should be able to retain the ion exchange resin beads when used in the feed or desalting compartment. Consequently, when ion exchange resins are used the ports should have flow channels with effective diameters which are smaller than the diameter of the resins, usually 0.3–0.45 mm.

FIG. 3(a) shows a port which is suitable for compartments that contain the ion exchange material in the felt/cloth form, or the compartments containing the turbulance promoting plastic mesh fillers (i.e., the concentrate compartments). The port which is fabricated from a single piece of material such as polypropylene or polytetrafluoroethylene, has many holes 54 with circular cross-section drilled or otherwise formed therein. When used in compartments that contain ion exchange material in the bead form, a woven or non-woven cloth with a mesh rating greater than about 80 is attached to one end of the port which is then installed with the mesh end facing the resin beads in the compartment. The non-woven cloth is typically made of a plastic such as polyethylene, polypropylene, polyester and the like.

FIG. 3(b) shows the same port design, but with soft elastomer outer surfaces to improve sealing with ion exchange membranes that have a rougher texture. The softer layer should be chemically stable relative to the streams being desalted/concentrated and may be made of a material such as low density polyethylene or styrene butadiene rubber.

FIG. 3(c) shows a port design which has square or rectangular channels in the central section. Such a port is readily formed by grooving a series of channels in a piece of plastic that is approximately half as thick as the gasket, cutting it into pieces of an appropriate port length. Two of the cut pieces are overlaid in a face to face confrontation so that the grooved channels match against each other to form a square or a rectangular channel. The two halves may be glued, welded, or otherwise joined together to form the one piece port. Care should be taken to ensure that the wall thickness of the finished piece is adequate to provide the requisite port rigidity. When the port is to be used in the gaskets that contain the ion exchange beads, a woven or non-woven cloth with a mesh rating of greater than about 80 is attached to end of the finished port facing the resin beads.

FIG. 3(d) shows a composite port construction. Here, a piece of non-woven mesh material having communicating channels therein is sandwiched between two layers of a suitable polymer film. Preferably, the density of the non-woven mesh material is higher than the density used in the flow paths of the concentrate compartments. The strand openings of the non-woven mesh should be less than the diameter of the resin beads used in the desalting compartments. The polymer film may be made of polypropylene, polytetrafluoroethylene and the like. The polymer film has a preferred thickness of 0.005"–0.01" so that it has adequate rigidity. When the ports are used in gaskets having a thickness which is greater than about 0.75 mm, the composite port may be made from multiple layers of the polymer film and the non-woven mesh, as shown in FIG. 3(e). The ports may have additional softer top and bottom layers as shown in FIG. 3(b), for example. Other suitable designs can be visualized by people skilled in the art.

FIGS. 2, 4, 5 and 5(a) show gaskets with multiple series flow paths. This type of construction is of particular use for large scale applications which require gaskets that are in the order of 1 m×1 m or bigger, for example. In essence, this type of construction is modular within the gaskets.

FIG. 2 shows a gasket which has two series flow paths 62, 64, each with four flow channel sections 66–72 and 74–80, respectively, connected in series and served by separate manifold holes. As here shown a total of eight manifold holes 82–88 and 90–96, and four ports P3–P6 are used for each gasket in order to supply the feed and to withdraw the product from the electrodeionization stack.

The arrangement of FIG. 2 enables the two halves 62–64 of the gasket to be connected either in parallel or to function as two independent stages. Alternatively, one can use common manifolds for the two halves, thus placing the two sections 62, 64 parallel, while reducing the number of manifold holes 102–108 (FIG. 4) the number of ports P7–P10 to four each. This four port gasket does not provide the option of having two independently operating stages.

FIGS. 5 and 5(a) show a gasket with four series flow paths 120–126, having a total of eight manifold holes 128–134 and 136–142, respectively, and eight ports P11–P14 and P15–P18. Each series flow path has four flow path sections (e.g. 51–54) connected in series. Other variations in the design will be apparent to those skilled in the art.

FIG. 6 shows a preferred construction of the inventive electrodeionization stack. The stack is assembled in the horizontal position, using a set of aligning pins (not shown). The entire assembly is held together by a set of clamping bolts and nuts (not shown). The gaskets comprising the desalting compartments have a thickness of 1.5–4 mm in order to contain the requisite amount of the ion exchange material. The gaskets used for the concentrating compartments are preferably thinner, in the order of 0.5–2 mm. However, both gaskets have an identical layout of the manifold holes and ribs so that a fully assembled stack has manifolds, ribs, and gasket edges properly aligned relative to each other in order to provide the requisite membrane support and sealing between the compartments and the adjoining membranes.

The gaskets are preferably designed to be symmetrical so that when rotated 180° about their axes the same gasket can become a desalting or concentrating compartment gasket. Such a requirement is not essential, particularly because the gaskets for the two streams may have different thickness. However, it is desirable for the same die cutter to be used to produce either type of gasket.

Commercial electrodeionization stacks may contain 20–100 cell pairs and may have gasket dimensions of 1 m×1 m or larger. The stack, comprising the gaskets, membranes, electrodes, and end plates may be held together in a filter press unit that uses a set of tie bolts or a hydraulic closure mechanism to provide the requisite sealing pressure.

Starting at the anode end (the left side) (FIG. 6), the stack has a steel end plate 150 (0.25–0.5" thick), a polypropylene end plate 152 (1–2" thick), and an anode electrode sheet 154 (0.062" thick), with rubber sealing gaskets in between (not shown). The electrode 154 may be made of platinum, platinum coated titanium or stainless steel, or a noble metal oxide such as iridium oxide coated on titanium. Electrodes made of all of these work satisfactorily in the slightly acidic medium encountered in the electrodeionization process. At the other end (right side), a similar assembly of a steel plate 156, a plastic end plate 158 and a cathode electrode sheet 160 is used. The cathode electrode material is preferably 316 stainless steel. The electrodes 154 and 160 have tabs T1, T2 for making electrical connections to an external DC power supply. The electrodes may fit within cavities in the plastic end plates 152, 158 or be of the same approximate overall length and width as the end plates. The gaskets and membranes are assembled between the two electrodes. The desalting (D) and concentrating (C) compartments are contained within the gaskets 162 and 164. The ion exchange membranes (e.g. cation membrane 166 and anion membrane 168) alternate in polarity.

The desalting compartments are packed with the ion exchange material, preferably a mixed bed resin, while the concentrating compartments contain a turbulence promoting non-woven mesh material. The solutions both enter and exit the stack, preferably from the cathode (the lower potential) end. Solutions are distributed to the individual chambers within the gaskets via manifold holes in the gaskets and membranes. The locations of the ports determine which gasket is being fed by a particular stream flowing through the manifold holes.

The solutions entering each gasket flows through the flow path 165 that are formed by manifold holes connected in series. In the arrangement shown, the flows of solutions in the D and C compartments are co-current. The solutions exiting the individual gaskets through the flow path 167 are channeled through the exit manifold holes and out of the electrodeionization stack assembly at the cathode end. The electrode rinse solutions ER and ER' are preferably fed through separate loops. One could also circulate the concentrate loop solution through the electrode rinse loops. The anode rinse solution or anolyte ER circulates through the anode gasket 170 and is separated from the adjacent dilute loop by an anion membrane 172, which may or may not be the same type as the other anion membranes 168 that are used in the stack. The cathode rinse solution or catholyte ER' circulates through the cathode gasket 174 and is isolated from the adjoining desalting stream by a cation membrane 176 which may or may not be of the same type as the other cation membranes 166 used in the stack.

The assembly sequence and operation of the electrodeionization process is best illustrated by FIG. 7 which shows a schematic of a pilot cell assembly containing eight cell pairs. The cell is constructed of cation 180 and anion 182 membranes separated by the desalting (D) and concentrating (C) compartments. Via internal manifold holes, the compartments are supplied with the appropriate solutions taken from their respective feed tanks 184, 186 (FIG. 8). The electrode rinse compartments, ER and ER', at the anode and cathode ends, respectively, are supplied with an electrode rinse stream from a common supply tank 188. The tank is preferably a separate tank which may receive material as an overflow from the concentrate tank, thus minimizing the introduction of oxidative byproducts arising from electrode reactions into the main part of the stack. Optionally, the electrode rinse loops can be fed from the concentrate tank itself.

A direct current driving force is applied at the anode 190 and cathode 192 terminals of the electrodeionization unit. The electrodes are housed within or adjacent to the plastic end plates 194 and 196, respectively. The cations $M^+$ are transported from the desalting compartments D, across the cation exchange membranes into the concentrating compartments. Concurrently the anions $X^-$ in the desalting compartments D are transported across the anion membranes and into the concentrating compartments C. The result is a progressive desalting of the feed stream. A concentrated waste stream is generated by the transport of the ions and by any water of hydration associated with them, the ion and hydration water transport being into the concentrate compartments.

As can be seen from the schematic of FIG. 7, extra concentrate compartments provide for the electrode rinse that receives the ions transported from the adjoining desalting compartments. For the most part, the mixed bed resin in the desalting compartments facilitates the transfer of ions from the bulk solution to the membrane surface, thereby increasing the current efficiency for the process. For example, when high levels of desalting takes place, the solutions conductivity is about 1 micromho or less so that there may be a certain amount of water splitting to yield $H^+$ and $OH^-$ ions. This splitting facilitates the displacement and transport of the trace residual ions which are present in the resin and the bulk solution, to the surfaces of the ion exchange membranes.

FIG. 8 is a block diagram which shows an electrodeionization process assembly that may be used to demonstrate the performance of the gasket and hardware of this invention. The assembled stack 200 is placed in a process assembly comprising the three solution loops, namely a feed loop 202, concentrate loop 204, and electrode rinse loop 206. The solution which is to be desalted is in the feed tank 184 and is circulated by means of pump P10 through the desalting compartments D of the stack via filter F, a flowmeter FM, and a flow regulating valve V operating under control of or in conjunction with a gage G. Similar setups are used to supply solutions from the concentrate and electrode rinse tanks 186, 188 through pumps P11 and P12, respectively. To simplify the drawing, bypass loops around the pumps are not shown in FIG. 8.

The feed stream of the desalting loop 202 is operated on a once through basis. The other two loops 204, 206 are preferably run in a feed and bleed mode. The flow rate in the feed loop 202 is regulated to obtain the target level of desalination. The pressure gauges G and the regulating valves V adjust the flow rates in the other two loops 204, 206 in order to obtain approximately the same pressure at all of the inlets of the cell stacks.

EXAMPLES

Electrodeionization Cellstack Construction

The gaskets of this invention were fabricated by die cutting sheets of low density polyethylene. The gasket's design is that shown in FIGS. 1(a), 1(b) and had overall dimensions of 13"×13". The gasket has three individual flow path sections 24, 26, 28 (FIG. 1(c)) which are connected in series with one another via two flow restrictor sections 46, 48. The overall length of the path through the gasket is about 30". The width of the flow path is about 2.875". The width of the flow restrictor sections is about 1". The effective area available for current transport is approximately 0.5 square feet. The thickness of the gaskets used in the desalting compartments ranged from 1.5–4 mm; however, most of the experiments were carried out in gaskets with an overall thickness of about 2.5 mm. To fabricate these gaskets, a 90 mil (2.25 mm) thick polyethylene sheet was die cut. A 5 mil thick layer of styrene-butadiene rubber sheet (trademark Kraton-G®, from Shell Chemical and supplied in sheet form by Clopay), was glued to each side of the gasket. The resulting composite gasket was flat and easy to assemble into an electrodeionization stack.

Each of the desalting gaskets had two ports P1, P2, made from multiple layers of about 5 mil polypropylene and 20 mil thick non-woven polypropylene netting having communicating passage ways assembled in a manner shown in FIG. 3(e). The netting's opening in the strand direction, was about 10 mil or 0.25 mm and was adequate to retain the ion exchange beads in the flow paths. Five layers of the film and four layers of the non-woven material were used to fabricate the composite which had an overall thickness of about 100–105 mils (2.5–2.6 mm). There were flat top and bottom surfaces on the finished port. The individual pieces of the composite port assembly were held together by thin adhesive tape. The finished ports were simply inserted in place, prior to filling the flow path cavity with the ion exchange material.

The soft "Kraton" material significantly improved the sealing between the gasket and the adjacent membranes. Furthermore the presence of the "Kraton" material substantially eliminated a migration of the ion exchange resin material between the gasket and the membrane during the stack assembly. As a result, the further bonding of the gasket and membrane was not essential. This feature has the added benefit that the cell can be dismantled and refurbished at a later date if it becomes necessary to change the resin beads or the specific ion exchange membranes. Thus, there is no need to throw away an entire assembly as would be when glued together.

The gasket for the concentrating compartments was fabricated in a similar die cutting manner. The overall thickness of the gasket was 1 mm and was fabricated from a 30 mil thick low density polyethylene sheet, to which an approximately 5 mil thick Kraton rubber sheeting was glued to both surfaces. The central series flow path was filled with 30–35 mil thick non-woven polypropylene netting (about 11 strands per inch) supplied by the Naltex Corporation. The resulting gasket, including the netting, was flat and easy to assemble into the stack.

Each of the gaskets has two ports which were fabricated from two pieces of approximately 5 mil polypropylene film with one non-woven polypropylene netting in the middle. The netting had about 18 strands per inch and an overall thickness of about 32 mils. The finished ports have flat top and bottom surfaces and a total thickness of about 42 mils held together by thin adhesive tape. These ports were simply inserted and held in place during the stack assembly.

The test electrodeionization stacks had eight cell pairs with the assembly of the various components in the order shown in FIG. 7. The cell was assembled horizontally and then tested in a vertical orientation, with the flow paths extending vertically. The assembly of the stack was facilitated by using six of the alignment holes H at the peripheries of the gaskets, hardware and membranes. The gaskets and membranes (equilibrated in salt water) were flat. The clearances around the alignment holes was sufficient to enable a proper assembly of the unit.

The assembly started from the anode end 150 (FIG. 6). After insertion of the composite ports, the central area of the desalting gaskets were filled with about a 50:50 mixture of the cation and anion exchange resins. The resins were properly washed and conditioned in 10–15% NaCl solution. Each of the desalting gaskets required about 125 ml of the resin. The flow paths were manually filled with the mixed bed resin in a damp form, thus ensuring a uniform application of the resin mixture to cover the entire flow area.

When properly assembled, the eight cell pair stack had a relatively low intercompartment leakage, about 2–10 ml/min at a pressure differential of four pounds per square inch.

For the initial electrodeionization studies, two stacks were assembled, each containing eight cell pairs assembled as shown in FIG. 7. Both stacks used anodes made of iridium oxide coated on titanium, available from the Electrode Products Inc. and stainless steel cathodes. The first stack (Stack I) was fabricated from CMT cation and AMT anion exchange membranes obtained from the Asahi Glass Co.

The desalting compartments were filled with a 50:50 mixture of IR 122 cation, resin and RA 402 anion resin.

Stack (Stack II) was fabricated from cation and anion exchange membranes from Ionics Inc. The desalting compartments were filled with a mixture of Ambersep 132 cation resin and Ambersep 440 anion resin. Both of these resins were obtained from the Rohm and Haas Co. The fully assembled stacks exhibited no measurable resin loss during the subsequent tests, demonstrating the effectiveness of the composite port in retaining the resin beads.

Example 1

Stack I was installed into and the piping connections were made in the test setup shown in FIG. 8. A DC power supply was connected to the anode T1 (FIG. 6) and cathode T2 terminals on the stack. The feed tank 184 (FIG. 8) was filled with sodium chloride solution, at a conductivity of 535 $\mu$S/cm. The concentrate and electrode rinse tanks 184, 186 were partly filled with dilute solutions of sodium chloride and sulfuric acid, respectively, at a conductivity of about 2.5–3.2 mS/cm. Pumps P10–P12 were turned on and the fluid flows through the stack were regulated with valves in the lines. Care was taken to maintain a pressure balance between the loops. At inlet pressures of about 4 psig, the flow rates in the feed, concentrate and electrode rinse loops 202, 204, 206 were 800 ml/min, 0.4 gal/min and 1.05 gal/min, respectively. The DC power supply was turned on and the voltage was controlled at 22V. This represents a unit cell voltage of about 2.2V, allowing about 4V for the electrode rinse loops.

During a two hour run, the current remained in the range of 1.3–1.4A (about 2.7A/ft$^2$ current density) while the conductivity in the concentrate and electrode rinse loops 206 increased to 4–5 mS/cm, due to an inflow of ions from the desalting loop. The product water conductivity remained fairly steady at about 6.5 $\mu$S/cm; representing >98% desalination of the feed.

Example 2

Stack II was installed into the setup shown in FIG. 8. The experiment was repeated along the lines described in Example 1. A sodium chloride solution at a conductivity of 540 $\mu$S/cm was used once again as the feed stream. Three trials, each lasting about 1 hr., were carried out at voltage drop of 22 V. Current throughput was in the range of 1.7–3.9A. Product water quality and stack pressure drops are tabulated below.

| Product water Conductivity | Flow rates Feed Concentrate Electrode rinse | | | Pressure drop at stack inlet, psig Feed Concentrate Electrode rinse | | |
| --- | --- | --- | --- | --- | --- | --- |
| $\mu$S/cm | ml/min | gal/min | gal/min | psig | | |
| 2.42 | 700 | 0.4 | 1.7 | 6.2 | 5.5 | 5.5 |
| 4.35 | 1000 | 0.55 | 1.95 | 8 | 7.5 | 7.5 |
| 2.78 | 760 | 0.4 | 1.55 | 4.9 | 4.5 | 4.5 |
| 3.1 | 850 | 0.4 | 1.6 | 5 | 4.2 | 4.4 |
| 4.6 | 920 | 0.47 | 1.75 | 6.2 | 5.8 | 5.8 |

The performance of Stack II is perhaps slightly superior to Stack I. The pressure drop in Stack II is slightly higher than Stack I. As can be seen from product water quality, Stack II also removed >98% of the salt in the incoming feed.

Example 3

Stacks I and II were hydraulically connected in series and installed into the setup shown in FIG. 8. Therefore, the setup is equivalent to six flow paths connected in series; with an overall path length of 60". Flow rates in the feed, concentrate and electrode rinse loops 202, 204, 206 were 1.2 l/min, 0.48 gal/min and 1.48 gal/min, respectively. Pressure drops at the inlet of the stacks at these flow rates were, respectively, 10.5, 10.5 and 10 psig. These pressures are in line with those observed with Stack II alone. Therefore, minimal additional pressure losses are incurred in circulating the solution through the additional three flow paths; indicating that the pressure recovery in the series flow path design in surprisingly good.

A sodium chloride solution with a conductivity of 650 $\mu$S/cm was used as the feed. Dilute sodium chloride and sulfuric acid were used in the concentrate and electrode rinse loops, respectively. Their conductivity has kept below 6 and 2 mS/cm respectively by dilution with water, as required. Electrically, the stacks were connected in parallel, so that each would have the same voltage applied across its terminals. A 22V voltage was applied across each of the stacks, which resulted in current throughputs of 1.4–1.6A in stack I and 0.8–1.2A in Stack II. The test ran for a period of about 5 hours. Product water quality was related to the conductivity of the concentrate as follows:

| Product water conductivity $\mu$S/cm | Concentrate conductivity mS/cm |
| --- | --- |
| 0.9–1.0 | 1.5–2.3 |
| 1.1–1.4 | 2.3–3.5 |
| 1.5–2.2 | 4.0–5.5 |

As can be seen, there is some impact on product water quality from the back diffusion of concentrate across the ion exchange membranes. However, the overall deionization is >99%. Current efficiency for the deionization process (defined by the ratio of equivalents of salt removed per faraday of current input) was >0.5.

At the conclusion of the deionization experiments, the stacks were opened and the internal components were inspected. The anion exchange membranes were slightly brownish (from the effect of pH shifts during the electrodeionization operation) but were otherwise in excellent condition. Importantly, the ion exchange packing in the desalting compartments was essentially undisturbed; i.e., no evidence of resin migration, aggregation etc.

Example 4

A new electrodeionization stack containing eight cell pairs was assembled with AMT, CMT ion exchange membranes. A 50:50 mixture of "Ambersep" 132 and 440 resins was used to fill the desalting compartments of the stack. The assembled stack was placed in the setup shown in FIG. 8. High fructose corn syrup solution containing about 220 gm/l fructose and 280 gm/l dextrose, 201 gm/l sodium, 42.5 gm/l magnesium was used as the feed to the desalting loop 202. The fructose solution had been subjected to a carbon treatment in order to remove the bulk of the high molecular weight organics and color bodies. The fructose solution had a conductivity of 348 $\mu$S/cm. The concentrate tank 186 was filled with six liters of the same fructose solution at the start of the experiment. A dilute sodium sulfate solution with a conductivity of 1.2 mS/cm filled the electrode rinse tank 188. The electrode terminals in the stack were connected to the DC power supply.

Solutions were circulated through the three loops 202, 204, 206, as in the previous examples. The higher viscosity of the fructose solution resulted in lower flow rates and higher pressure drops in the desalting loop. In general, the flow rates and pressure drops in the loops were as follows: 160 ml/min@6.5 psig in the desalting loop 202, 0.5 gal/min@5.8 psig in the concentrate loop 204, and 1.7 gal/min@5.5 psig in the electrode rinse loop 206. The process was operated for a period of twelve hours. Conductivity in the concentrate and electrode rinse loops 204, 204 was maintained below 5 and 3 mS/cm, respectively, by withdrawing material and adding either the fructose solution or water, as needed. During the test period, the applied voltage ranged from 25 to 36 V and the current throughput was 0.8–1.0 A. The product fructose solution conductivity was 9–16 $\mu$S/cm. An analysis of the product in the 9–10 $\mu$S/cm range showed no detectable levels of Na, Ca or Mg. Therefore, the electrodeionization process is particularly effective in desalting sugar solutions.

Those who are skilled in the art will readily perceive how to modify the invention. Therefore, the appended claims are to be construed to cover all equivalent structures which fall within the true scope and spirit of the invention.

The claimed invention is:

1. A gasket for use in electrodeionization cell stacks, said gasket having a uniform thickness, manifold holes and ports for supplying and removing aqueous solutions into and out of said gaskets, at least some of said manifold holes providing conduits for enabling a solution to flow to other gaskets in the stack, there being a maximum of four of said manifold holes per series flow path, an active area of said gasket comprising multiple flow path sections connected together by flow restrictors in order to form at least one series flow path within said gasket, each of said flow path sections having a width which is greater than the width of the flow restrictors, said restrictor reducing the velocity of fluid flowing through said flow path to about 50–100% of the velocity of said fluid in said flow restrictor sections, each series flow path having a first of said ports for providing a fluid inlet to said path and a second of said ports for providing a fluid outlet from said path, said ports having a thickness which is substantially the same thickness of said gasket, said ports being more rigid than the gasket and comprising substantially flat top and bottom surfaces with at least one fluid flow channel therebetween; and an ion exchange material filling the series flow path sections and the connecting flow restrictor sections.

2. The gasket of claim 1 wherein said ion exchange material is selected from a group consisting of cation resin beads, anion resin beads, mixed resin beads, knit felt containing resin beads, microporous felt containing resin beads, knit cloth containing resin beads, and microporous cloth containing resin beads.

3. The gasket of claim 2 further comprising a relatively rigid polymeric sheet with a soft elastomeric surface layer on at least one surface of the polymeric sheet.

4. The gasket of claim 3 wherein said soft elastomeric surface layer is on both surfaces of the polymeric sheet.

5. A system for desalting an aqueous feed stream using a stack of gaskets of claim 2, said stack comprising an anode at one end and a cathode at an opposite with cation and anion membranes forming a succession of dilute and concentrate cells between said anode and said cathode, and at least one of said gaskets positioned between said membranes.

6. The system of claim 5 wherein said gaskets forming said dilute and concentrate cells have different thickness.

7. The gasket of claim 2 wherein said flow path sections have a width in the range of about 2.5" to 10".

8. The gasket of claim 2 wherein said gasket contains at least one series flow path comprised of 2 to 6 flow path sections.

9. The gasket of claim 2 wherein said gasket contains 1 to 4 series flow paths.

10. The gasket of claim 1 wherein the ion exchange material is selected from a group consisting of felt or cloth.

11. The gasket of claim 10 wherein said felt or cloth contains resin beads within a tightly knit or microporous cloth material, such resin containing cloth material being formed into a pouch in flow areas of the gasket.

12. The gasket of claim 1 wherein each of said flow path sections has a width in the order of two to eight-inches and said flow path sections make 180° turns were connected together by flow restrictor sections in order to form the series flow path, there being a maximum of four of said manifold holes per series flow path.

13. The gasket of claim 1 wherein said gasket is a concentrate compartment of an electrodeionization stack, and a mesh spacer means covering the series flow paths including the flow path sections and their connecting flow restrictor sections.

14. The gasket of claim 1 wherein said port is a mesh spacer means having communicating passage therein, said mesh spacer means having said top and bottom surfaces in the form of covering plates.

15. An electrodeionization cell assembly comprising a series of components beginning with an anode and ending with a cathode, said series of components further comprising a series of paired compartments comprising desalting compartments paired and alternating with concentrating compartments, said series of compartments being positioned between said anode and cathode, each of said pair having said desalting compartments located on a anode side of said concentrating compartments, each of said pair of compartments being defined by anion membranes before and after said pair and by one of said cation membranes centrally positioned between said anion membranes, said anion membranes being on an anode side of said desalting compartments and a cathode side of said concentrating compartments, said cation membranes being on said cathode side of said desalting compartments and on said anode side of said concentrating compartments, each of said compartments comprising a gasket having an active area defined by ribs of gasket materials separating voids forming flow path sections in said active area, said flow path sections being joined by restriction sections to complete at least one series flow path extending between two ends, said series flow path being filled with an ion exchange material in said desalting compartment and a supporting mesh in the concentration compartment, at least one manifold hole formed in said gasket at each of said two ends of said series flow path, and port means coupling said manifold holes to an individually associated end of said series of flow path.

16. The cell of claim 15 wherein said ion exchange material is selected from a group consisting of cation resin beads, anion resin beads, mixed resin beads, knit felt containing resin beads, microporous felt containing ion exchange sites, knit cloth containing resin beads, and microporous cloth containing resin beads.

17. The cell of claim 15 wherein said gasket has a uniform thickness, said port means comprises a plate having a thickness which is no greater than said uniform thickness, said plate having a plurality of through holes, and said port being located in said gasket at a position where said through holes interconnect said manifold holes with said series flow path, whereby fluids entering one of said manifold holes flows through one of said ports, said series flow path, another of said ports, and exits another of said manifold holes, and said port having a provision to block exit of resin beads.

18. The cell of claim 17 wherein said anode, cathode, membranes and gaskets are aligned and assembled in stacks to form said cell, said manifold holes being aligned in said stack in order to form conduits for fluid flow through said stack.

19. The cell of claim 15 wherein said series flow path includes restrictor sections for promoting turbulence in a flow of a fluid through said series flow path.

20. The cell of claim 15 wherein said restrictor sections have widths providing channels in the order of 20–90% of the width of said flow path sections.

21. The cell of claim 15 wherein said gasket has a uniform thickness, said port means comprises a composite port which has alternate layers of film and non-woven netting, said port being in the form of a plate having a thickness which is no greater than said uniform thickness, said plate having a plurality of through holes, and said port being located in said gasket at a position where said through holes interconnect said manifold holes with said series flow path, whereby fluids entering one of said manifold holes flows through one of said ports, said series flow path, another of said ports, and exits another of said manifold holes.

22. The gasket of claim 15 wherein said flow path includes turbulence promoters in said flow path of at least said concentration compartment.

23. The cell assembly of claim 15 wherein said gaskets forming said desalting compartment has a first thickness and said gaskets forming said concentrating compartment has a thickness which is different from said first thickness.

24. A stack of gaskets forming an electrodeionization cell comprising a plurality of gaskets having ion exchange material filled in active areas; said gaskets having ion exchange material filled in active areas; said gaskets being sealed in a face to face relationship in order to form said stack, anion and cation exchange membranes separating said active areas; at least a pair of conduits extending through said stack, said conduits being formed by aligned manifold holes in said gaskets and membranes, an entrance port connecting said active area to one of said pair of said conduits and an exit port connecting said active area to the other of said pair of said conduits; means for driving a fluid through said one conduit, said active area, and out the other of said conduits; and means in said active area for improving distribution of said fluid within said active area.

25. The stack of gaskets of claim 24 wherein there are at least four of said manifold holes which align to form two pair of said conduits, said gaskets being connected in pairs to said conduits, one gasket in each pair of gaskets being connected to a first pair of said conduits and the other gasket in each of said pairs of gaskets being connected to the other pair of said gaskets.

26. The stack of claim 25 wherein said active area is divided by gasket material to form a serpentine path through said active area.

27. An improved gasket for use in electrodeionization cell stacks, containing manifold holes and ports to supply and remove aqueous solutions into and out of said gaskets, as well as manifold holes to serve as conduits or solution flow to the other gaskets in the cell stack, said gasket being of uniform thickness, the active area of which comprises multiple flow paths connected together to form series flow paths, there being one or more such series flow paths within a gasket, each of said flow path being 2 to 8" wide and connected by flow restrictor sections at points where they make 180° turns, there being a maximum of four manifold holes per series flow path, each series flow path in addition having a port for fluid inlet and a second port for fluid outlet, said ports being of substantially the same thickness but more rigid than the gasket and comprising substantially flat top and bottom surfaces between which a channel or channels for fluid flow is provided; and the series flow paths and the connecting flow restrictor sections being filled with an ion exchange material when installed into an assembled cell stack, said ports being capable of retaining the ion exchange material within the active area.

28. The electrodeionization cell set forth in any one of the claims 1, 15, 24 or 27 for desalting an aqueous solution wherein said ion exchange material is selected from a group consisting of cation resin beads, anion resin beads, mixed resin beads, knit felt containing resin beads, microporous felt containing resin beads, knit cloth containing resin beads, and microporous cloth containing resin beads.

29. The electrodeionization cell set forth in any one of the claims 1, or 27 for desalting said aqueous solution, wherein said aqueous solution contains a material selected from a group consisting and dextrose, fructose, sucrose, and mixtures thereof; and wherein said ion exchange material is selected from a group consisting of cation resin beads, anion resin beads, mixed resin beads, knit felt containing resin beads, microporous felt containing resin beads, knit cloth containing resin beads, and microporous cloth containing resin beads.

30. A gasket for use in electrodeionization cell stacks, said gasket having a uniform thickness, manifold holes and ports for supplying and removing aqueous solutions into and out of said gaskets, at least some of said manifold holes providing conduits for enabling a solutions to flow directly to other gaskets in the stack, there being a maximum of four of said manifold holes per series flow path, an active area of said gasket comprising multiple flow path sections connected together by flow restrictors in order to form at least one series flow path within said gasket. Each of said flow path sections having a width which is greater than the width of the flow restructures, said restructures reducing the velocity of fluid flowing through said flow path to about 50–100% of the velocity of said fluid in said flow restructure sections, each series flow path having a first of said ports for providing a fluid inlet to said path and a section of said ports for providing a fluid outlet from said path, said ports having a thickness which is substantially the same thickness of said gasket, said ports comprising substantially flat top and bottom surfaces with at least one fluid flow channel therebetween; and an ion exchange materials filling the series flow path sections and the connecting flow restructure sections.

* * * * *